3,201,589
INTEGRATED NEUTRON FLUX INDICATOR
Frederick W. Kuether, Minneapolis, Minn., assignor to Honeywell Inc., a corporation of Delaware
Filed Dec. 26, 1961, Ser. No. 161,795
9 Claims. (Cl. 250—83.1)

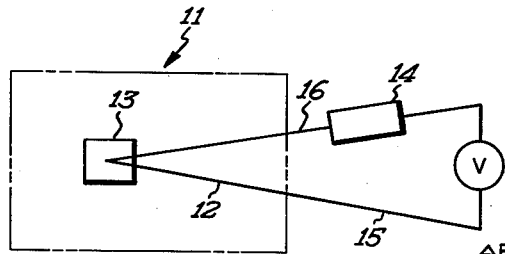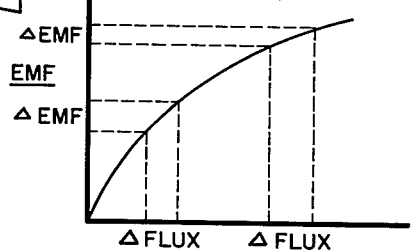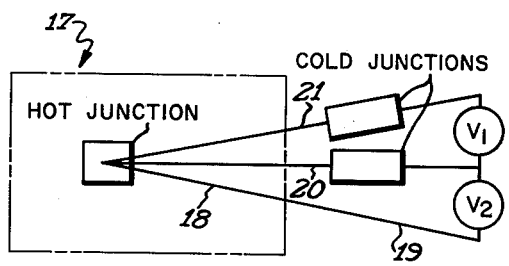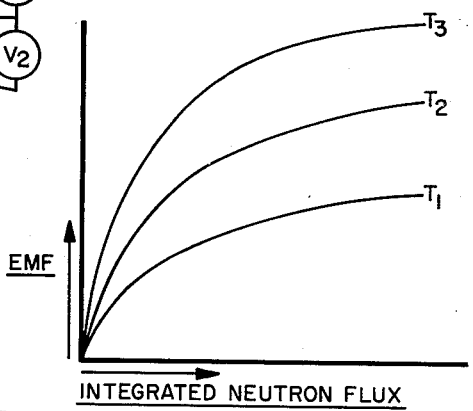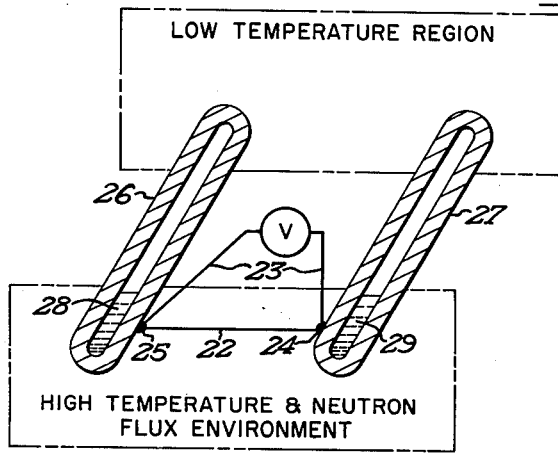

This invention relates generally to a neutron flux measuring apparatus and more particularly to an apparatus adapted to measure integrated neutron flux by a novel thermocouple composition.

Thermocouples are known in the prior art which are adapted to measure neutron flux density. Such devices utilize the heat which accompanies the transmutation of a neutron sensitive coating placed on the hot junction of the thermocouple. The increase in temperature resulting from the transmutation of the coating causes an increase in the E.M.F. generated by the thermocouple.

The present invention, as stated above, is directed to the measurement of integrated neutron flux rather than its time derivative, neutron flux density. A known relation between chemical composition of a thermocouple material and its E.M.F. is used to indicate directly the change in chemical composition (and so E.M.F. of a thermocouple) due to nuclear transmutations. Thus, a change in the E.M.F. of such a thermocouple indicates a change in the composition of one or both legs thereof as a result of the transmutation caused by impinging neutrons.

In the drawings: FIGURE 1 is a diagrammatic view of an integrated neutron flux indicating means in accordance with the present invention.

FIGURE 2 is a graph illustrating the operation of the device of the present invention.

FIGURE 3 is a further embodiment in accordance with the present invention.

FIGURE 4 is a graph illustrating the operation of the device disclosed in FIGURE 3.

FIGURE 5 is a preferred modification which illustrates a means for controlling the junction temperatures of a device embodied in the present invention.

To illustrate the measurement of integrated neutron flux, the following embodiment has been chosen and is illustrated schematically in FIGURE 1: a thermocouple, the legs of which are composed respectively of two isotopes of iron ($Fe^{54}$ and $Fe^{56}$). This figure shows a neutron environment 11 which subjects the thermocouple 12 to impinging radiation. Hot and cold junctions of the thermocouple are represented by 13 and 14 respectively. In operation, the radiation causes transmutation to occur in leg 15 ($Fe^{54}$) and leg 16 ($Fe^{56}$) resulting in a change in composition of both legs. In this particular example, the $Fe^{54}$ transmutes partially to $Mn^{54}$ and the $Fe^{56}$ partially to $Mn^{56}$. Upon exposure to such neutron bombardment, the composition of the legs and the generated E.M.F. thereof will change in the following manner:

TABLE I

*Thermal E.M.F. for $10^{13}$ fission neutrons/$cm.^2$ sec. as a function of time*

| Time | Atomic Percent | | Thermal E.M.F. at 1,500° F. ($\mu v.$) |
|---|---|---|---|
| | $Mn^{54}$ in $Fe^{54}$ wire, percent/wt. | $Mn^{56}$ in $Fe^{56}$ wire, percent/wt. | |
| 2.6 hrs | 0.0019 | 0.0000035 | 2.4 |
| 1 day | 0.018 | 0.000007 | 23 |
| 2 days | 0.036 | 0.000007 | 46 |
| 3 days | 0.054 | 0.000007 | 70 |
| 5 days | 0.088 | 0.000007 | 115 |
| 10 days | 0.18 | 0.000007 | 230 |
| 20 days | 0.35 | 0.000007 | 455 |
| 30 days | 0.52 | 0.000007 | 677 |
| 100 days | 1.58 | 0.000007 | 1,980 |
| 310 days | 3.98 | 0.000007 | 5,180 |
| ∞ | 8.00 | 0.000007 | (¹) |

¹ Beyond limits of alpha iron solid solution.

Note that in this specific instance the $Mn^{56}$ concentration is very small and reaches equilibrium in one day. As a result the change in the E.M.F. of the thermocouple depends exclusively on the $Mn^{54}$ content of the $Fe^{54}$ wire.

It can be seen from a study of this table that the change in E.M.F. generated by the thermocouple is dependent on the chemical composition of the legs (if kept at a constant temperature) and that this composition is in turn dependent on the neutron flux.

Referring now to FIGURE 2, such a thermocouple indicates integrated neutron flux in the following manner. The change of E.M.F. is plotted against integrated neutron flux. It can be seen, that for a given change in E.M.F., a change in integrated neutron flux can be determined.

Of course, many other isotopes are available which can be used in the same manner as that illustrated for the $Fe^{54}$–$FE^{56}$ thermocouple illustrated above, the change in composition giving rise to E.M.F. measure of neutron flux. Below, in Table II are a few illustrative pairs which can be used in this manner:

TABLE II $Pd^{106}$—$Pd^{108}$
$W^{182}$—$W^{186}$
$Ir^{191}$—$Ir^{193}$
$Mg^{24}$—$Mg^{26}$
$Cr^{50}$—$Cr^{52}$
$Ni^{60}$—$Ni^{62}$
$Ni^{58}$—$Ni^{62}$
$Cu^{63}$—$Cu^{65}$
$Mo^{92}$—$Mo^{95}$
$Zn^{64}$—$Zn^{67}$

As discussed above, transmutation is accompanied by a release of heat. Also the temperature of the neutron source may vary. To render the thermocouple independent of such changes in temperature, it is necessary to incorporate some means which maintains the temperature gradient thereof constant or to correct for the temperature changes which affect the thermocouple. Many such means would be obvious to those skilled in the art. The following two are suggested for illustrative purposes as two means of surmounting the alternate situations discussed above.

(1) Temperature Correction Means: Referring now to FIGURE 3, a thermocouple is schematically shown which is composed of three members. A neutron environment, indicated by 17, is shown impinging upon the thermocouple generally indicated as 18. The thermocouple is composed of three legs 19 ($Fe^{54}$), 20 ($Fe^{56}$) and 21 (Constantan). Legs 19 and 20 are arranged to indicate changes in neutron flux through changes in composition and resultant E.M.F. as discussed previously. Leg 21 in conjunction with 19 or 20 is arranged to indicate changes in temperature, operating as a typical thermocouple, since Constantan is largely unaffected by the neutron bombardment as is $Fe^{56}$.

Calibration of the device is necessary at various temperatures and neutron flux densities in order to render information somewhat like that shown in FIGURE 4.

This figure shows E.M.F. plotted against integrated neutron flux for various temperatures. Thus, by measuring the temperature of the neutron source by means of legs 20 and 21 of FIGURE 3, the correct curve would be selected from FIGURE 4 which would indicate the correct neutron flux for a particular E.M.F. or change in E.M.F.

(2) Junction Temperature Control Means: Another method suggests itself which is the use of a pair of sealed tubes partially filled with appropriate liquids, chosen by boiling point to maintain any desired constant temperatures at the hot and cold junctions. To maintain such temperatures, the tubes must be mounted in an oblique position with the upper ends protruding into a lower temperature region in order to allow condensation of the vapor.

Such a system would appear schematically as shown in FIGURE 5. The thermocouple is composed of $Fe^{54}$ and $Fe^{56}$ members, indicated as 22 and 23 respectively.

The hot and cold junctions 24 and 25 are in contact with two sealed tubes 26 and 27. Tube 26 contains water (28) and tube 27 contains calcium bromide, for example (29) which would be molten at the normal operating temperatures of the device. Any two materials can be used depending on the temperature gradient desired. By establishing cyclic evaporation and condensation, the boiling liquids in the tubes maintain constant temperatures which are dependent upon the individual boiling points of the liquids contained therein. In this way, a constant temperature gradient is achieved between the hot and cold junctions 24 and 25. If desired, the sealed tubes themselves can be fabricated from $Fe^{56}$ and included in the thermocouple circuit as leads in place of members indicated as 23.

Having thus described the present invention, what I desire to obtain by Letters Patent is:

1. An integrated neutron flux indicating means comprising at least three members of dissimilar metals joined together to form thermocouple pairs, at least a first of said members being selected from a group which undergoes a change in composition upon exposure to a neutron environment, and at least a second of said members possessing low neutron capture capabilities; and means associated with said thermocouple pairs to measure the resulting E.M.F. outputs of said thermocouple pairs.

2. An integrated neutron flux indicating means comprising at least two members joined together to provide a thermocouple, one of said members being composed essentially of $Fe^{54}$, which transmutes upon exposure to neutron radiation, a second of said members being composed essentially of $Fe^{56}$, which undergoes a limited transmutation upon exposure to neutron radiation, both of said transmutations resulting in a change in the E.M.F. produced by said thermocouple; and means associated with said thermocouple to measure the resulting E.M.F. change due to said transmutation.

3. An integrated neutron flux indicating device comprising a pair of dissimilar metal members forming a thermocouple, said members being selected from the group which undergoes a change in composition upon exposure to a neutron environment thereby changing the E.M.F. output of said thermocouple; means for maintaining a constant temperature differential between the hot and cold junctions of said thermocouple; and means associated with said thermocouple to measure said E.M.F.

4. An integrated neutron flux indicating device comprising a pair of members forming a thermocouple, said members being different isotopes of the same element, at least one of said isotopes partially transmuting upon exposure to a neutron flux thereby changing the E.M.F. output of said thermocouple; constant temperature means associated with the junctions of said thermocouple; and means associated with said thermocouple to measure said E.M.F.

5. An integrated neutron flux indicating means comprising a pair of members forming a thermocouple, one of said members composed essentially of $Fe^{54}$ and undergoing transmutation upon exposure to neutron radiation thereby changing the E.M.F. output of said thermocouple; constant temperature means associated with the junctions of said thermocouple; and means associated with said thermocouple to measure said E.M.F.

6. An integrated neutron flux indicating device comprising a pair of metal members forming a thermocouple, the first of said members consisting essentially of $Fe^{54}$ and undergoing transmutation upon exposure to neutron radiation, the second of said members consisting essentially of $Fe^{56}$ and undergoing a limited transmutation upon exposure to neutron radiation, said transmutations resulting in a change in the E.M.F. output of said thermocouple; constant temperature means associated with the junctions of said thermocouple; and means associated with said thermocouple to measure said E.M.F.

7. An article for indicating integrated neutron flux comprising: a thermocouple adapted to be subjected to an environment experiencing changes in neutron flux and in temperature, the response of said thermocouple as an E.M.F. output being indicative of said changes, said thermocouple consisting of at least two members of dissimilar metals, said metals being of a material which undergoes a change in composition upon exposure to neutron flux, said composition affecting said output of said thermocouple; means associated with said thermocouple to measure said output; and means for eliminating that portion of said output due to temperature whereby an indication of integrated neutron flux independent of changes in temperature is obtained.

8. An article for indicating integrated neutron flux comprising: a thermocouple adapted to be subjected to an environment experiencing changes in neutron flux and in temperature, the response of said thermocouple as an E.M.F. output being indicative of said changes, said thermocouple consisting of at least two members of dissimilar metals, with at least one of said metals being of a material which undergoes a change in composition upon exposure to neutron flux, said compositional change affecting said output of said thermocouple; means associated with said thermocouple to measure said output; and means for eliminating that portion of said output due to temperature whereby an indication of integrated neutron flux independent of changes in temperature is obtained.

9. An article for indicating integrated neutron flux comprising: a thermocouple adapted to be subject to an environment experiencing changes in neutron flux and in temperature, the response of said thermocouple as an E.M.F. output being indicative of said changes, said thermocouple consisting of at least two metal members, one of said members being composed essentially of $Fe^{54}$ which transmutes upon exposure to neutron flux, said transmutation resulting in a change in said output of said thermocouple; means associated with said thermocouple to measure said output; and means for eliminating that portion of said output due to temperature whereby an indication of integrated neutron flux independent of changes in temperature is obtained.

References Cited by the Examiner

UNITED STATES PATENTS

| 2,564,626 | 8/51 | MacMahon | 250—83.1 |
| 2,814,731 | 11/57 | Werme | 250—83.1 |
| 2,958,021 | 10/60 | Cornelison | 62—119 |
| 2,988,639 | 6/61 | Welker | 250—83.1 |

RALPH G. NILSON, *Primary Examiner.*